No. 658,326. Patented Sept. 18, 1900.
F. THEILENGERDES.
CAR BRAKE.
(Application filed June 8, 1900.)
(No Model.) 6 Sheets—Sheet 1.
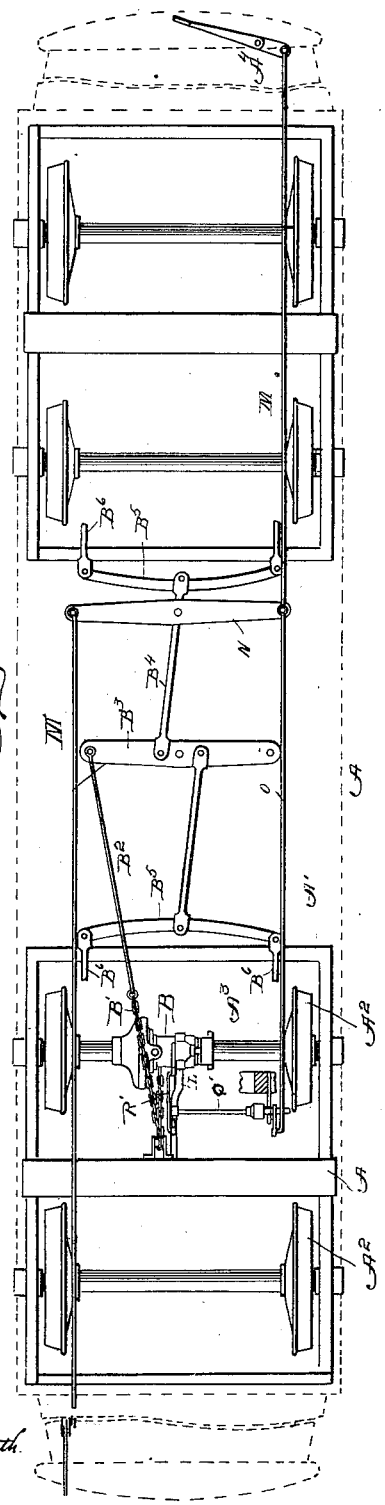
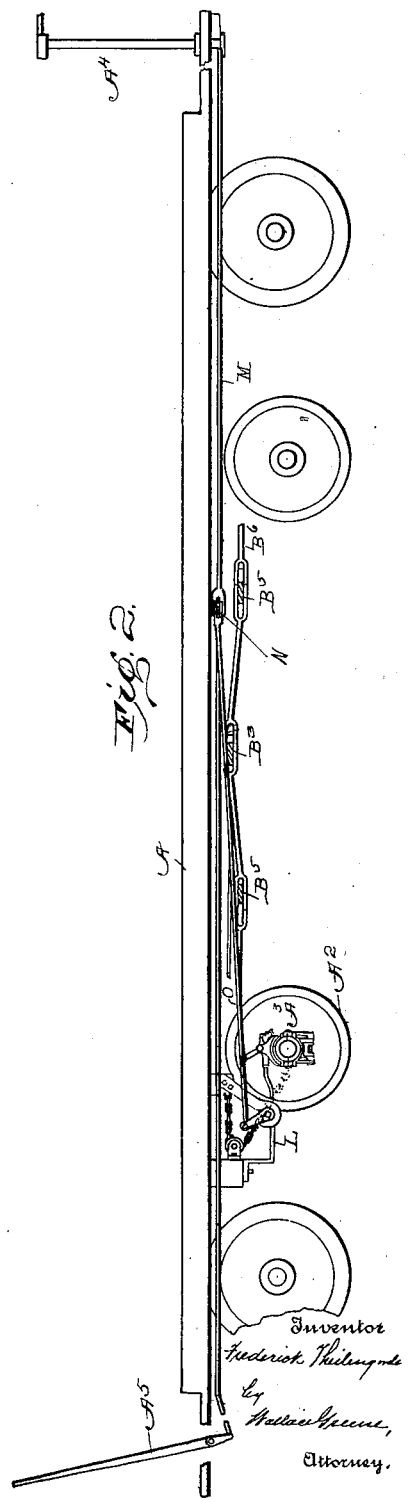

No. 658,326. Patented Sept. 18, 1900.
F. THEILENGERDES.
CAR BRAKE.
(Application filed June 8, 1900.)
(No Model.) 6 Sheets—Sheet 2.
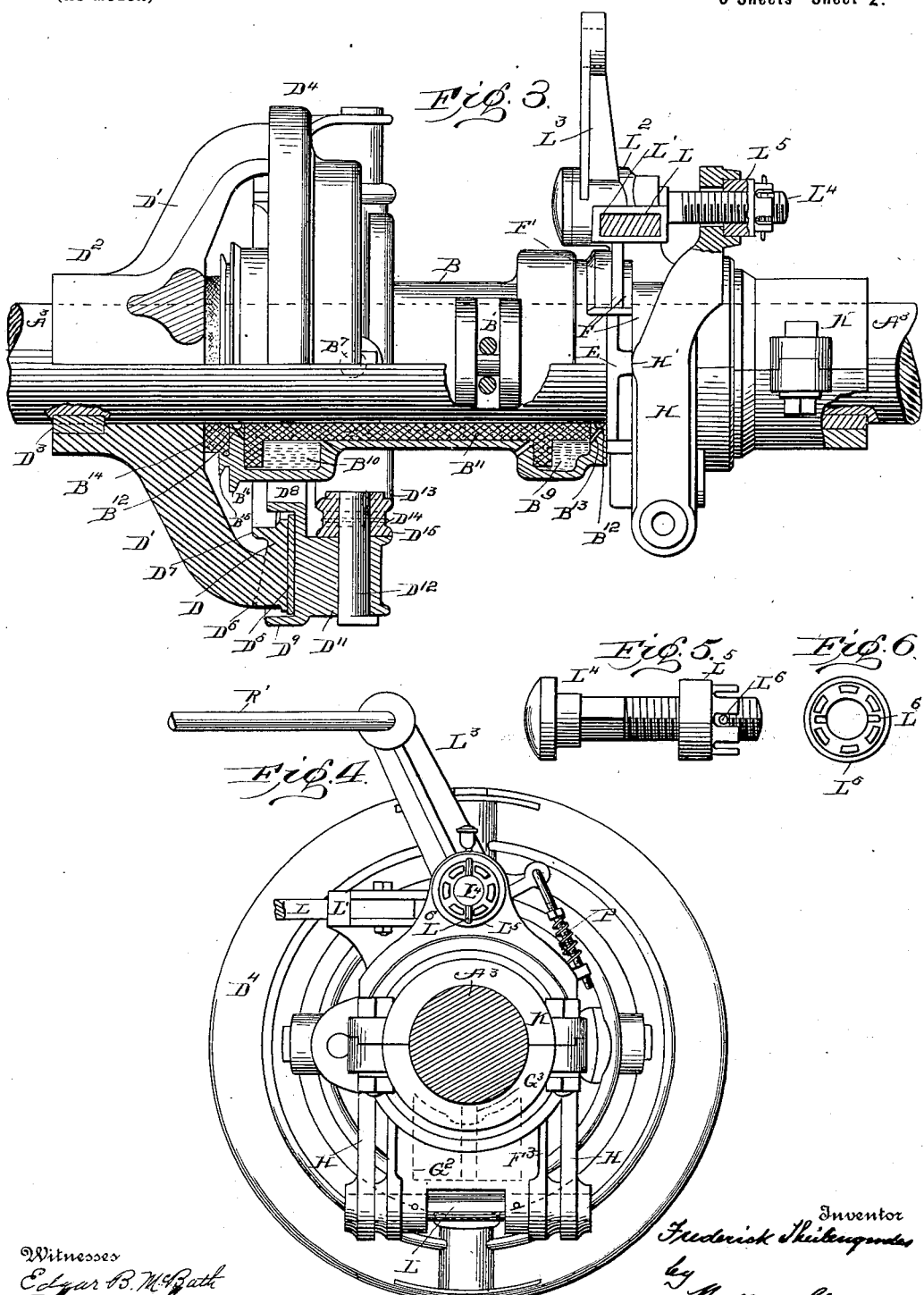

No. 658,326. Patented Sept. 18, 1900.
F. THEILENGERDES.
CAR BRAKE.
(Application filed June 8, 1900.)
(No Model.) 6 Sheets—Sheet 3.
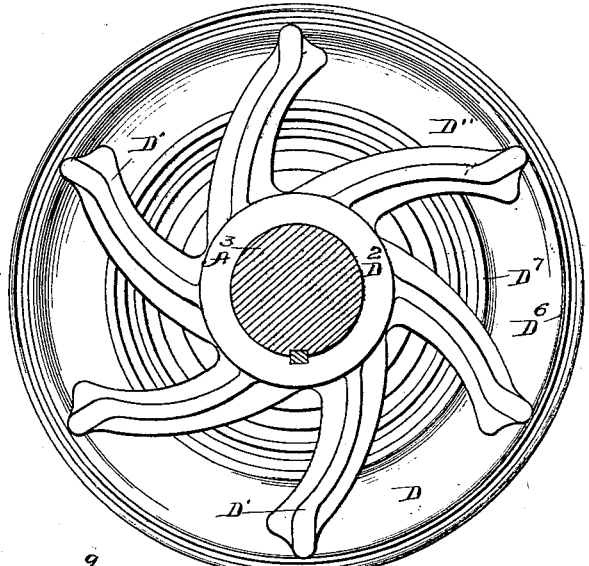
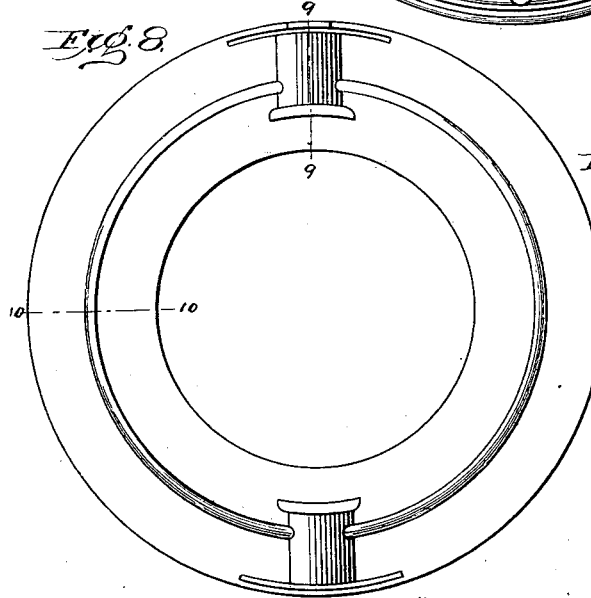
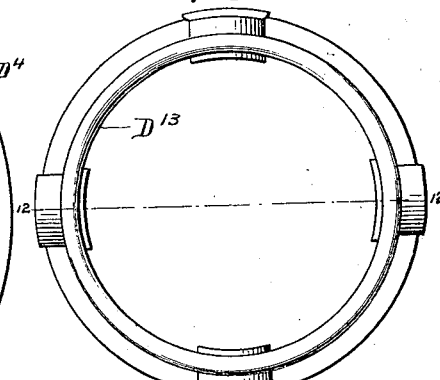
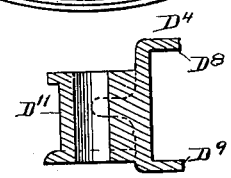
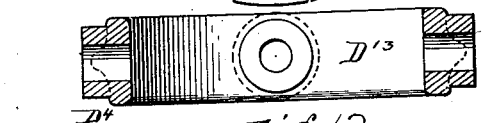

No. 658,326. Patented Sept. 18, 1900.
F. THEILENGERDES.
CAR BRAKE.
(Application filed June 8, 1900.)
(No Model.) 6 Sheets—Sheet 4.
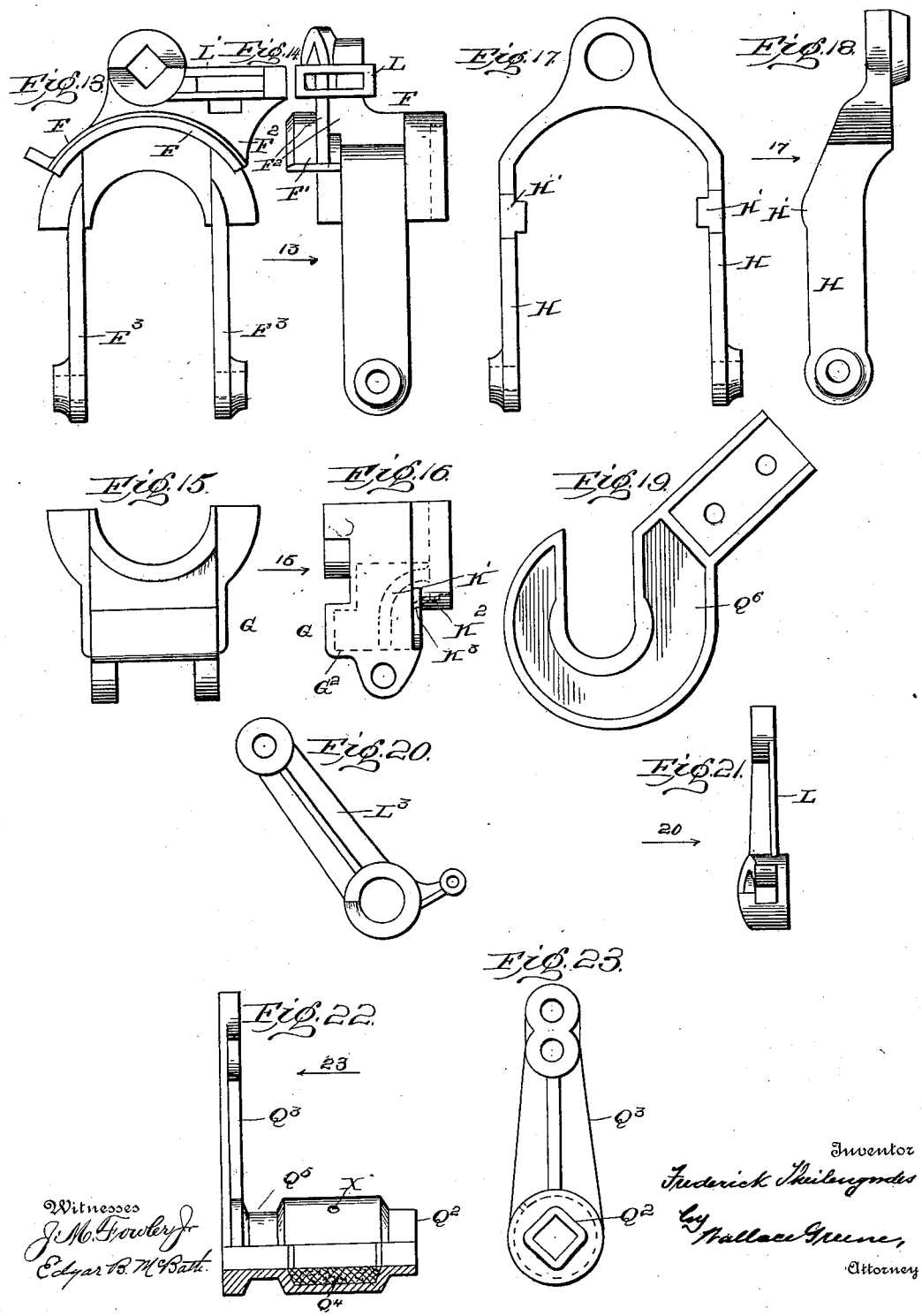

No. 658,326. Patented Sept. 18, 1900.
F. THEILENGERDES.
CAR BRAKE.
(Application filed June 8, 1900.)
(No Model.) 6 Sheets—Sheet 5.
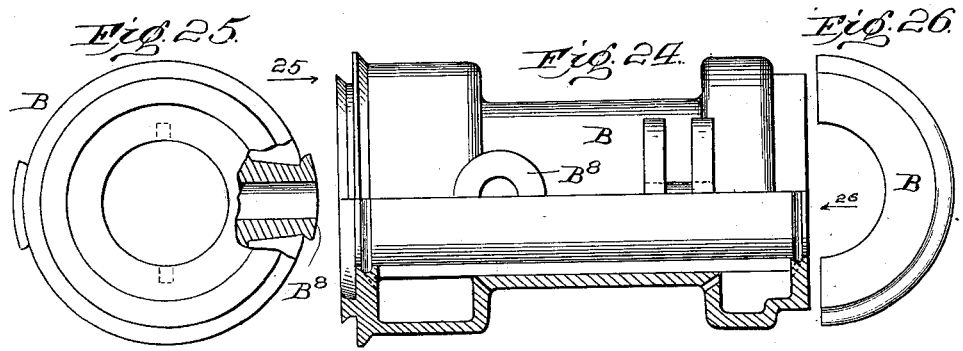
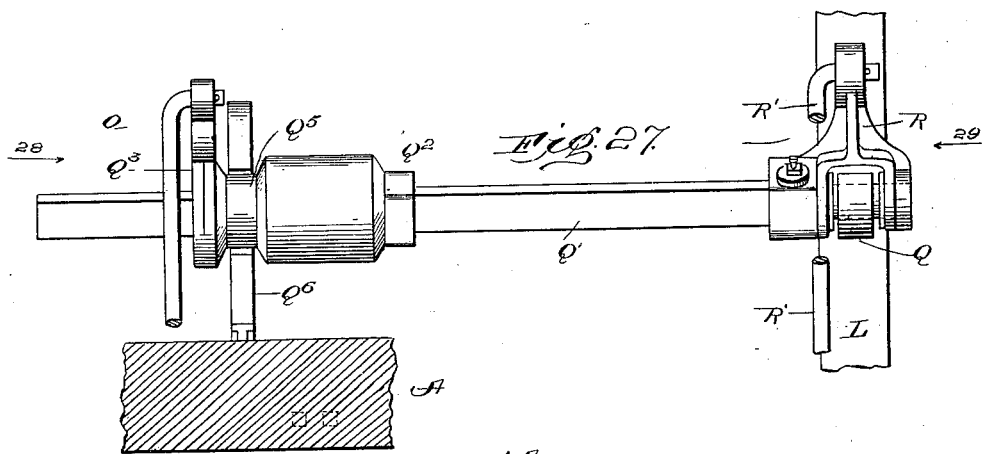
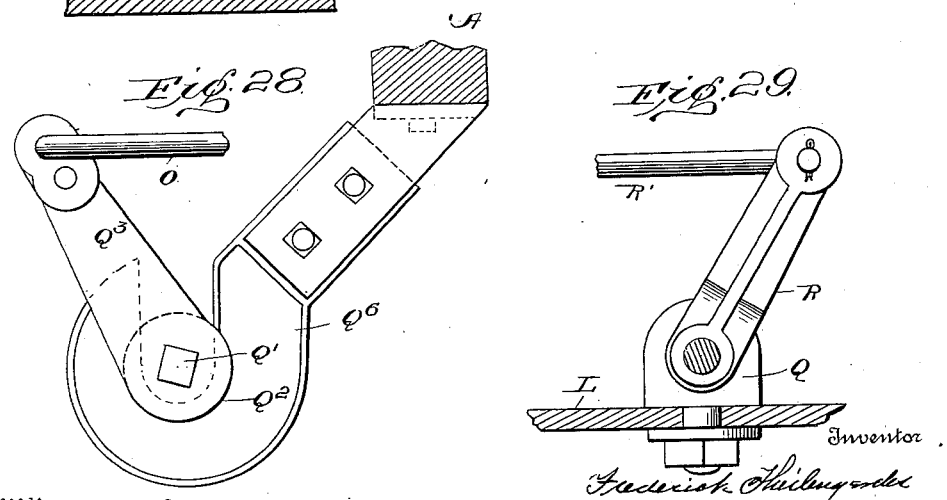

No. 658,326. Patented Sept. 18, 1900.
F. THEILENGERDES.
CAR BRAKE.
(Application filed June 8, 1900.)

(No Model.) 6 Sheets—Sheet 6.

Witnesses
J. M. Fowler Jr
Edgar B. McBath

Inventor
Frederick Theilengerdes
by Wallace  
Attorney

UNITED STATES PATENT OFFICE.

FREDERICK THEILENGERDES, OF MEMPHIS, TENNESSEE, ASSIGNOR TO THE AMERICAN POWER BRAKE COMPANY, OF SAME PLACE.

CAR-BRAKE.

SPECIFICATION forming part of Letters Patent No. 658,326, dated September 18, 1900.

Application filed June 8, 1900. Serial No. 19,532. (No model.)

*To all whom it may concern:*

Be it known that I, FREDERICK THEILENGERDES, a citizen of the United States, residing at Memphis, in the county of Shelby, in the State of Tennessee, have invented a new and useful Car-Brake, of which the following is a specification.

The invention relates to brakes of that class in which a friction-clutch transmits the motion of the car-axle to devices operating to arrest the motion of the car.

The objects of this invention are to insure proper contact of the friction-surfaces of the clutch at all times, whether the parts are unequally worn or not; to protect the surfaces from lubricants; to provide automatic lubricating devices for all those parts of the apparatus that should be lubricated; to protect lubricated parts from dust, and to provide apparatus such that even on curves and with swiveled trucks the clutch may be perfectly operated from either end of the car.

Figure 30:
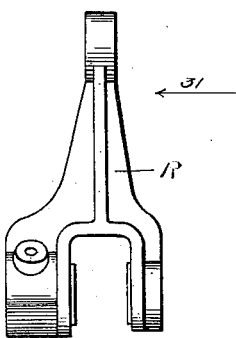
Figure 31:
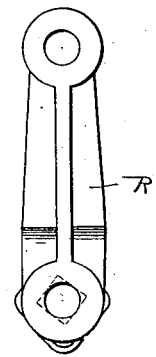
Figure 32:
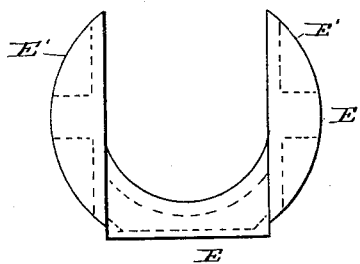
Figure 33:
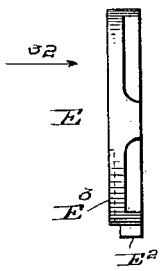

In the accompanying drawings, Figure 1 is a plan view of my novel apparatus as it appears when used with a swiveled truck under each end of the car. Fig. 2 is a side elevation of the devices seen in Fig. 1. Fig. 3 is an enlarged partly-sectional elevation showing the clutch and adjacent parts. Fig. 4 is a view looking from the right in Fig. 3. Figs. 5 and 6 show a bolt and nut of Fig. 3 detached. Fig. 7 is a view looking from the left in Fig. 3. Figs. 8, 9, and 10 are detailed views of a certain friction disk or ring. Figs. 11 and 12 are views of a gimbal-ring supporting the ring of Figs. 8, 9, and 10. Fig. 13 shows detached a saddle member seen in Fig. 3. Fig. 14 shows the same member looking from the right in Fig. 13. Figs. 15 and 16 are views similar to Figs. 13 and 14, showing a member which normally lies below that part of the shaft upon which the saddle rests. Figs. 17 and 18 are analogous views of a forked lever of Fig. 3. Fig. 19 shows a certain hanger. Figs. 20 and 21 show a lever having a cam-face to coact with a cam-face on the member shown in Figs. 13 and 14. Figs. 22 and 23 show detached a part seen in combination in Figs. 1, 2, and 27. Fig. 24 shows by itself a drum-sleeve of Fig. 3. Fig. 25 is a view looking from the left in Fig. 24. Fig. 26 is a partial view looking from the right in the same figure. Fig. 27 is an enlarged plan view showing parts seen in like view in Fig. 1. Figs. 28 and 29 are views looking from the left and from the right in Fig. 27. Figs. 30 and 31 show a detached lever seen in Figs. 1, 2, 27, and 29. Figs. 32 and 33 are side and edge views of a member seen also in Fig. 3.

The relative arrangement of the mechanisms may be seen in Figs. 1 and 2, where A represents a part of a car-body, A' a brake-frame, $A^2$ car-wheels, and $A^3$ their axles. At each end of the car is mounted a common brake-staff $A^4$ or brake-lever $A^5$, connected with a friction-clutch through which the rotation of one of the axles winds upon a drum-sleeve B a chain B', connected with ordinary brake-beams (not shown) by a common arrangement of rods and levers $B^2$ $B^3$ $B^4$ $B^5$ $B^6$. The principal novelty lies in the clutch and the devices adjacent thereto, the car, the trucks, the brake-staffs, and the brakes proper, or beams and shoes being entirely without novelty herein claimed.

The friction-clutch and drum-sleeve are shown on a large scale in Figs. 3, 4, 7, 8, 9, 10, 11, and 12. The axle $A^3$ bears an annular disk D, the ring being supported by curved arms D', connecting it with a hub $D^2$, lying at some distance from the plane of the ring and fixed to the shaft by a key $D^3$. Upon the axle is also loosely mounted the drum-sleeve B, upon which winds the chain B'. Rigidly connected to the drum is a second annular disk or ring $D^4$ to coact with the ring D, a ring $D^5$, of leather or the like, preferably, being interposed, however, between the opposing faces of the rings. The ring D has on its non-working face annular ribs $D^6$ $D^7$, which give it rigidity and prevent oil from traveling out along the arms or spokes D' and finally reaching the friction-surfaces. The ring $D^4$ of Figs. 8, 9, and 10 has flanges $D^8$ $D^9$, forming with it an annular trough to receive the leather disk and the ring D, and also has a central annular rib $D^{10}$ upon the opposite face. It is further provided upon opposite sides with bearings $D^{11}$ to receive short gudgeons $D^{12}$, fixed in a smaller gimbal-ring $D^{13}$ by means of pins $D^{14}$ passing through gudgeons and the bosses $D^{15}$ in which they lie. The ring $D^{13}$ is mounted in like manner upon gudgeons $B^7$, fixed in bosses $B^8$ on the drum-sleeve at ninety degrees angular distance from the gudgeons of the disk $D^4$. From this construction it follows that the latter disk or ring has a universal adjustment and when pushed toward the coacting disk will automatically tilt in such manner as to press all parts of the latter equally no matter whether or not the face of the latter is, as it is intended to be before wear occurs, perpendicular to the shaft $A^3$.

In order that the drum-sleeve B may require oil only at long intervals, it is enlarged near each end, and in each enlargement is formed an annular chamber $B^9$ $B^{10}$ for holding oil. The sleeve is provided with diametrically-opposite longitudinal grooves to receive felt wicks $B^{11}$ to convey oil to the shaft's surface, and oil that may creep along the shaft is for the most part caught in annular grooves $B^{12}$, whence it passes down through channels $B^{13}$ into the chambers $B^9$ $B^{10}$, whence it is taken by the wick. The sleeve B extends past the plane of the friction disks nearly to the hub $D^2$, and between its end face and the end face of the hub is a felt ring $B^{14}$, held in a dovetail recess in the end of the sleeve and serving to exclude dust. Any oil that may escape at this end of the sleeve is thrown off at the edges of two annular flanges $B^{15}$ $B^{16}$, the dust, absorbing oil and accumulating at these points, aiding in the work, as it is thrown off whenever the sleeve rotates quickly.

Against that end of the sleeve opposite the hub $D^2$ rests a U-shaped member E, Figs. 3, 32, and 33, passed upward from below against the shaft $A^3$ and consisting of two segments E', connected below by a web $E^2$, which has that face next the sleeve cut back, as shown at $E^3$, Fig. 33, so that the pressure may be transmitted by the segments alone. This is done in order that the segments may transmit the same pressure at top and bottom, and hence have no tendency to tilt or wear unequally. Upon the shaft, above the member just described, rests a saddle-like member F, Figs. 3, 13, and 14, provided with a curved flange F' to exclude dust from the end of the sleeve B, with upwardly-extending webs $F^2$ and with downwardly-extending arms $F^3$. Between these arms an oil-reservoir member G, Figs. 3, 4, 15, and 16, is pushed up against the shaft $A^3$, and outside of the same arms is a forked lever H, Figs. 3, 4, 17, and 18, provided with projections H' to rest against the segments E', Figs. 3, 32, and 33. Through the lower ends of the members H G $F^3$ a fulcrum-pin L is passed, whereby the saddle member supports all the others. Upon the shaft $A^3$ alongside these members is fixed a locking-collar K, which prevents them from moving away from the drum-sleeve B. This collar extends into a recess in the members F G, Figs. 14 and 16, and its end face is lubricated by a wick K', Fig. 16, extending into the oil-reservoir $G^2$ in the member G, and from the same reservoir $G^2$ a wick $G^3$ extends upward to the shaft $A^3$, as shown in Fig. 4. In the recess in the members F G is formed an annular groove $K^2$, from which passages $K^3$ lead to the reservoir, whereby any surplus oil is caught and returned to the receptacle from which it was taken by the wick. The saddle is held against rotation by a flat bar L, fixed in a socket L' and having its other end attached to any convenient portion of the car-truck. The webs $F^2$ bear a projection $L^2$, having lateral cam-faces to meet corresponding faces on a lever $L^3$. A bolt $L^4$, Figs. 3 and 5, passes centrally through the cam-faced portions of the projection $L^2$ and lever $L^3$, in the former of which it cannot rotate. The threaded end portion of this bolt passes loosely through an opening in the upper end of the lever H and bears upon its end a cylindrical nut $L^5$, which is adjusted as desired and then locked to the bolt by a pin $L^6$, lying in radial slots in the outer end portion of the nut. This nut fits in an annular flange around the bolt-opening in the lever H, and thus holds the bolt central in that opening and prevents injury to the threads. Now if the lever $L^3$ be swung in the proper direction the cam-faces tend to force the saddle from the drum-sleeve B; but as the collar K prevents the movement suggested the bolt itself is drawn back, swinging the lever H about the pin I, pressing the member E against the sleeve and forcing the friction-ring $D^4$ against its companion D, so that the drum rotates with the axle, winds the chain B', and applies the brake. The lever $L^3$ is so swung by means of the hand devices $A^4$ $A^5$ at the ends of the car acting through rods M, a lever N, centrally pivoted to the car, a rod O, and devices shown in Figs. 1, 2, 4, 22, 23, 27, 28, 29, 30, and 31, and is returned to position by a spring P, Fig. 4, which also takes up all lost motion and causes the brake to respond instantly to movement of the hand devices at the end of the car.

Upon the bar L is swiveled a standard Q, Figs. 27 and 29, in which works the rounded end portion of a non-cylindrical bar Q', projecting from the bar L toward the side of the car and having its opposite end portion sliding without rotation in a long sleeve $Q^2$, provided with a projecting lever $Q^3$, to the free end of which the rod O, Figs. 1 and 2, is attached.

The sleeve $Q^2$ is internally chambered at $Q^4$, Fig. 22, to receive a lubricant through an aperture X and is externally grooved at $Q^5$ to rest loosely in a bracket $Q^6$, which supports it, yet allows the bar to swing slightly from side to side. A forked lever R embraces the standard Q and is fixed to the bar Q', and its other end is connected by a rod R' to the free end of the cam-lever $L^3$. It is plain from this construction that a pull on the rod O, exerted through the hand devices at the end of the car, will compel the rod Q' to rotate with the arm or lever R and that the connecting-rod R' will necessarily swing the arm or lever $L^3$, forcing longitudinal movement of the bolt $L^4$ and compelling engagement of the clutch in the manner already set forth. It is further evident that as the truck swings with respect to the car the rod Q' will slide in the sleeve $Q^2$ without disturbing the operative relation of the various devices.

What I claim is—

1. In a car-brake of the class described, the combination with a car-axle and brake-applying devices to be operated from said axle, of an annular friction-clutch member fixed to said axle, a coacting annular friction member mounted to rock automatically upon axes approximately at right angles to each other, and means for forcibly moving said axes toward the member first mentioned.

2. In a car-brake, the combination with an axle and brake-applying devices to be operated therefrom, of a clutch member rotating with the axle, a coacting clutch member rotated by frictional engagement with the member first named to actuate said devices and supported by gimbal-rings, whereby automatic universal adjustment of its frictional face is permitted, and means for forcing said rings toward and away from the member rotating with the axle.

3. In a car-brake, the combination with the car-axle, of a friction-clutch member fixed to the axle, with its working face perpendicular thereto, a second friction member revolubly mounted to rock upon axes at right angles to each other, means for moving the second member toward and from the first member, and means whereby rotation of the second member actuates brake-applying devices.

4. The combination with an axle and a hub fixed thereon, of a friction-ring at one side of said hub and rigidly supported therefrom, a drum-sleeve mounted to slide and rotate upon the axle, gimbal-rings borne by the drum-sleeve the outer one coacting with said friction-ring, means for forcing the drum-sleeve toward said hub, an oil-reservoir within the drum-sleeve, a wick leading from said reservoir to the axle, and means whereby the rotation of the drum-sleeve actuates brake-applying devices.

5. The combination with the axle, the hub thereon and the friction-ring supported by the hub, of the drum-sleeve sliding and rotating upon the axle, a coacting rocking friction-ring borne by said sleeve, means for constantly applying oil to that part of the axle within the sleeve, and the ring of felt or the like secured about the axle in that end of the drum-sleeve nearest said hub.

6. The combination with the axle, a hub fixed thereon and a friction-ring rigidly supported from the hub, of a collar fixed to the axle at some distance from the hub, a drum-sleeve mounted to slide and rotate upon the axle between said hub and collar, a coacting friction-ring mounted upon the drum-sleeve to rock upon two axes at right angles to each other, devices operable at will, reacting against said collar and forcing said drum toward the hub, and a spring arranged to yieldingly resist the action of said devices.

7. The combination with a car and its brake, of independent trucks pivotally supporting the ends of the car, a brake-operating friction-clutch upon one axle, clutch-operating devices supported by the truck, a pivoted lever supported from the car near said axle, means whereby a brakeman at the end of the car may swing said lever, at will, and connections of automatically-adjustable length transmitting the rotary motion of the lever to said devices, whereby said devices are operated regardless of relative swinging of the truck.

8. The combination of a car and its truck, of a brake-operating friction-clutch upon one truck-axle, devices supported by the truck alone, for throwing the clutch into engagement, a sleeve mounted to both swing and rotate in a bearing supported from the car, a bar sliding but not rotating in said sleeve, means whereby the rotation of the bar actuates said devices, and means whereby said sleeve may be rotated from either end of the car.

9. The combination with a car and its truck, of a brake-operating friction-clutch upon one of the axles, a brake-staff at the end of the car, a sleeve mounted to swing and to rotate in a bearing supported by the car alone, a bar sliding but not rotating in said sleeve, means whereby said sleeve and bar may be rotated by the movement of the brake-staff, and means whereby the rotation of the bar throws said clutch into engagement.

In testimony whereof I affix my signature in the presence of two witnesses.

FREDERICK THEILENGERDES.

Witnesses:
 WALLACE GREENE,
 EDGAR B. MCBATH.